Sept. 23, 1924.　　　　　　　　　　　　　　　　1,509,503
E. J. DOBERSTEIN
GATHERING REEL
Filed March 13, 1922

Inventor:
Edward J. Doberstein
Clarence F. Poole
Atty.

Patented Sept. 23, 1924.

1,509,503

UNITED STATES PATENT OFFICE.

EDWARD J. DOBERSTEIN, OF BLUE ISLAND, ILLINOIS, ASSIGNOR TO GOODMAN MANUFACTURING COMPANY, OF CHICAGO, ILLINOIS, A CORPORATION OF ILLINOIS.

GATHERING REEL.

Application filed March 13, 1922. Serial No. 543,156.

*To all whom it may concern:*

Be it known that I, EDWARD J. DOBERSTEIN, a citizen of the United States, residing at Blue Island, in the county of Cook and State of Illinois, have invented an Improvement in Gathering Reels, of which the following is a specification.

This invention relates to improvements in gathering reels of the type adapted to be mounted on mining locomotives and has for its principal object to provide an improved device of the class described.

Electrically operated locomotives are frequently provided with conductor cables adapted to afford electrical connection with the trolley wires when the locomotive is being operated over areas of track which are not supplied with feed wires. The conductor cable is usually wound on a gathering reel mounted on the locomotive, which reel is either operatively connected to the locomotive axle or is driven by an independent motor so as to wind the conductor cable on the reel as the locomotive approaches the point of connection of the conductor cable to the feed wire. With gathering reels of the class described, it is desirable to maintain a slight tension on the conductor cable as the latter is being wound on the reel. On the other hand, as the conductor cable is being unreeled, it is desirable to provide a slight braking action to the reel so as to eliminate "over-running" of the same.

A reel of the above character is shown and described in United States Letters Patent bearing Number 1,438,394, issued December 12, 1922 to Glenn W. Packer. In the construction therein shown, the power is transmitted to the reel through the medium of an expanding friction band which is automatically expanded to afford a driving connection between the reel and the driving member when the latter is driven in one direction. Means are also provided for affording automatic braking action on the reel when it is moved in the opposite direction to unwind the cable therefrom.

My improved form of power transmitting device forming the subject-matter of the present invention functions on a principle similar to the Packer device referred to, but the driving mechanism includes a friction segment movable radially into engagement with the reel drum in order to drive the latter. An improved mechanism for adjusting the driving and braking tension of the friction device is also provided.

The invention consists in the construction, combination and operation of parts as will hereinafter be described in connection with the accompanying drawings and more particularly defined in the appended claims.

Figure 1:
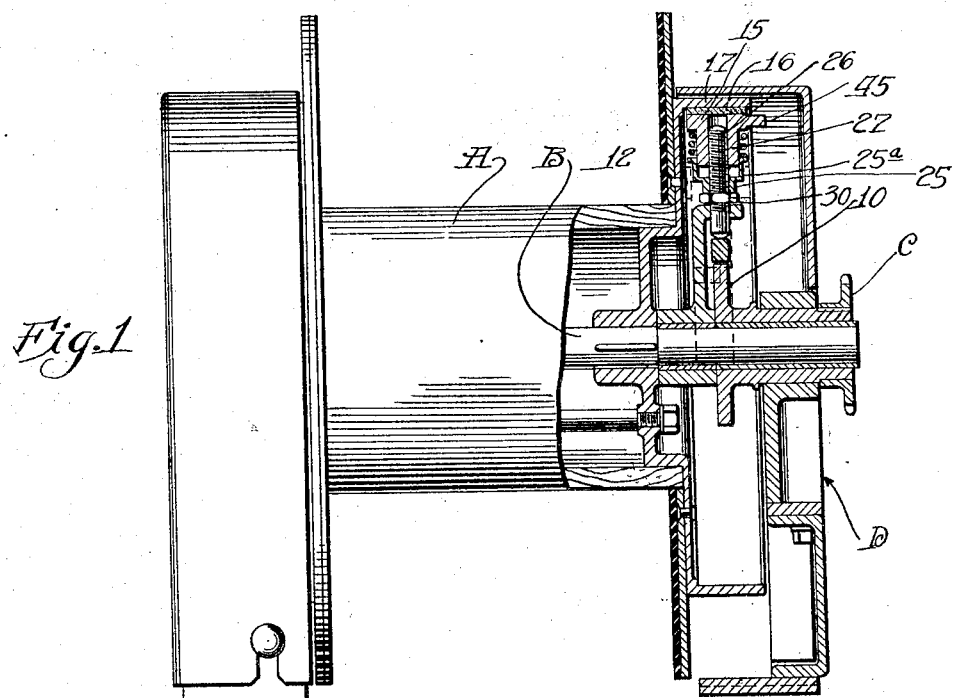

In the drawings, Figure 1 is a side view of a reel with the driving mechanism shown in vertical cross-section.

Figure 2:
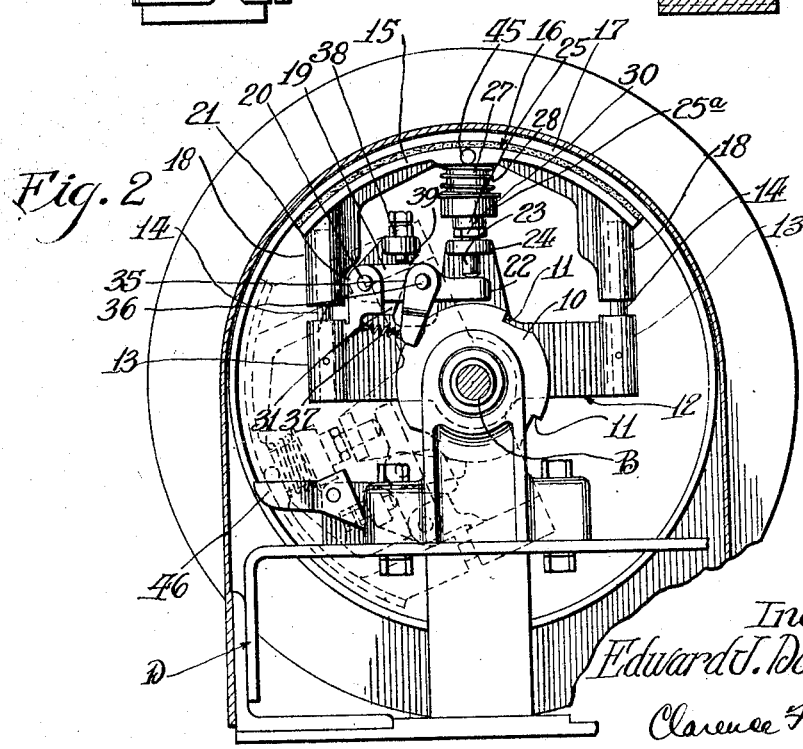

Fig. 2 is an end view of the reel with the driving sprocket and cover plate removed, and showing the driving mechanism in driving position in full lines and in braking position in dotted lines.

Referring now to details of construction of the embodiment illustrated in the drawings, the gathering reel A is mounted on shaft B having a suitable driving sprocket C at one end thereof. The reel and associated parts are supported on a suitable frame D. A disk 10, operatively connected with the sprocket C, is rotatably mounted on the shaft B. A plurality of notches 11, 11, are formed in the periphery of the disk 10 as shown. A frame member 12 is also journaled on the shaft B and is provided with a pair of laterally extending arms 13, 13, having a pair of parallelly disposed guide rods 14, 14, on opposite ends thereof. An arcuate brake shoe 15 is provided with a friction piece 16 of fibrous material, or its equivalent, and is adapted to engage the brake drum 17 forming a part of the reel A to drive the latter. The guide rods 14, 14, extend into suitable lugs 18, 18, formed adjacent opposite ends of the brake shoe 15 so as to permit radial movement of said brake shoe relative to the frame 12.

A lever 19 is pivoted at 20 in a stud 21 mounted on the frame 12. The outer end 22 of said lever arm engages a movable pin 23 projecting upwardly through the lug 24 integral with the frame 12 and having a longitudinally adjustable collar 25 thereon. The upper end 26 of the rod 23 extends into a suitable annular stud 27 forming a part of the shoe 15. The collar 25 has an enlarged annular portion 25ᵃ adapted to fit over the end of the stud 27. A spring 28 is interposed between the annular portion 25ᵃ and the outer face of the brake shoe 15 as shown. A nut 30 has threaded engagement on the pin 23 and supports the collar 25. Variation in the tension of spring 28 is afforded by adjusting the position of nut 30 on said pin. The spring 28 is normally adapted to hold the pin 23 in engagement with the outer end of lever arm 19. The inward or downward movement of said arm is limited by a stop 31 on the frame 12. A set screw 38 is mounted on a projection 39 integral with the frame 12 and is adjustable to limit the outward or upward movement of said lever arm. A pawl 35 is pivoted at 36 on the arm 19 and is provided with a compression spring 37 adapted to hold said pawl in engagement with the disk 10.

A projection 45 is formed on the brake shoe 15 and is adapted to engage a dog 46 mounted on the supporting frame D, said dog being arranged so as to allow the projection to pass it while the reel is being wound or rotated in a clockwise direction, but will check the rotation of the entire frame and brake shoe when the reel is being unwound or is being rotated in a counter-clockwise direction, as shown in dotted lines in Fig. 2.

The operation of the device is as follows: The disk 10 is adapted to be rotated by the driving mechanism in a clockwise direction (see Fig. 2) when the locomotive is advancing toward the point of connection of the conductor cable to the supply wires. As the disk is thus rotated, the pawl 35 engages with one of the notches 11 as shown in Fig. 2, whereupon the lever arm 19 is pivoted outwardly thereby moving the pin 23 in a radial direction. The spring 28 is thereupon compressed and the brake shoe is forced into driving engagement with the drum 17 thereby transmitting the driving torque to the reel. As already suggested, it is desirable to maintain a tension on the conductor cable as it is being wound on the reel and to this end the set screw 38 limits the amount of relative movement of the friction shoe 15 and frame 12. By means of this arrangement, the disk 10 may be rotated at a slightly greater speed than is necessary to retrieve the conductor cable on the reel, and the movement of the friction shoe 15 is limited so as to limit the amount of frictional contact and thus provide a slipping frictional driving engagement with the drum. It will be noted that the arrangement of the dog 46 and notches 11, 11, is such that the reel can be driven in but one direction to wind the cable thereon.

Referring now to the arrangement for applying a brake to the reel during the time that the locomotive is moving away from the point of connection of the conductor cable and the latter is being withdrawn from the reel, it will be seen that the spring 28 serves to maintain the brake shoe 15 in constant contact with drum 17 so that when the cable is unwound from the reel, and the latter is rotated in a counter-clockwise direction, the entire frame member 12 and the shoe 15 carried thereby will be rotated into a position shown in dotted lines in Fig. 2, in which the stop 45 engages the dog 46 mounted on the frame D. In this position the brake shoe is under sufficient tension of the spring 28 to retard the rotation of the cable so as to eliminate the danger of "over-running" of the conductor cable. The amount of tension of spring 28 may be adjusted by screwing the nut 30 on the pin 23.

I claim as my invention:

1. In a device of the class described, a reel, a friction drum operatively connected with said reel, a frame rotatably mounted concentric with said drum, driving mechanism for said reel, friction means carried by and guided to move radially respective to said frame, ratchet mechanism affording operative connection between said frame and driving means in one direction of rotation of the latter, means on said frame actuated by the driving torque to move said friction means into driving engagement with the drum and means limiting the rotation of said frame in the direction opposite to that in which it is driven.

2. In a device of the class described, a reel, a friction drum operatively connected with said reel, a frame rotatably mounted concentric with said drum, driving mechanism for said reel, friction means carried by and guided to move radially respective to said frame, ratchet mechanism affording operative connection between said frame and driving means in one direction of rotation of the latter, means on said frame actuated by the driving torque to move said friction means into driving engagement with the drum, means limiting the relative movement of said friction means and said frame, and means limiting the rotation of said frame in the direction opposite to that in which it is driven.

3. In a device of the class described, a reel, a friction drum operatively connected with said reel, a frame rotatably mounted concentric with said drum, driving mechanism for said reel, friction means carried by and movable respective to said frame, ratchet mechanism affording operative connection between said frame and driving means in one direction of rotation of the latter, tension means normally imposing a limited degree of friction contact of said friction means on said drum, means on said frame actuated by the driving torque to increase the tension of said last named means, and means limiting the rotation of said frame in the direction opposite to that in which it is driven.

Signed at Chicago, in the county of Cook and State of Illinois, this 9th day of March, 1922.

EDWARD J. DOBERSTEIN.